United States Patent
Moran et al.

(10) Patent No.: US 12,406,048 B2
(45) Date of Patent: Sep. 2, 2025

(54) DISTRIBUTED VERIFICATION OF ATTESTATION EVIDENCE

(71) Applicant: Arm Limited, Cambridge (GB)

(72) Inventors: Brendan James Moran, Coton (GB); Gustavo Federico Petri, Cambridge (GB); Thomas Fossati, Cambridge (GB)

(73) Assignee: ARM LIMITED, Cambridge (GB)

( * ) Notice: Subject to any disclaimer, the term of this patent is extended or adjusted under 35 U.S.C. 154(b) by 325 days.

(21) Appl. No.: 18/106,750

(22) Filed: Feb. 7, 2023

(65) Prior Publication Data

US 2024/0265083 A1    Aug. 8, 2024

(51) Int. Cl.
*G06F 21/44* (2013.01)

(52) U.S. Cl.
CPC .................... *G06F 21/44* (2013.01)

(58) Field of Classification Search
CPC ......... G06F 21/44; G06F 21/53; G06F 21/606
See application file for complete search history.

(56) References Cited

U.S. PATENT DOCUMENTS

| | | | |
|---|---|---|---|
| 8,880,667 B2 * | 11/2014 | Novak | G06F 21/64 709/224 |
| 11,595,213 B2 * | 2/2023 | Moran | H04L 63/0281 |
| 2015/0113618 A1 * | 4/2015 | Sinha | G06F 21/44 726/6 |
| 2016/0366180 A1 * | 12/2016 | Smith | H04W 4/70 |
| 2019/0311123 A1 * | 10/2019 | Lal | G06F 21/57 |
| 2020/0322380 A1 * | 10/2020 | Sheth | H04L 63/162 |
| 2021/0105265 A1 * | 4/2021 | Yang | H04W 12/047 |
| 2022/0131856 A1 * | 4/2022 | Xia | H04L 63/0853 |

FOREIGN PATENT DOCUMENTS

| | | | | |
|---|---|---|---|---|
| EP | 3648438 B1 * | 6/2021 | | G06F 16/211 |
| WO | WO-2024227510 A1 * | 11/2024 | | G06F 21/57 |
| WO | WO-2024260532 A1 * | 12/2024 | | G06F 21/57 |

* cited by examiner

*Primary Examiner* — Christopher A Revak
(74) *Attorney, Agent, or Firm* — Talem IP Law, LLP

(57) ABSTRACT

A method to distribute verification of attestation evidence and a verifiable system are provided. Method includes receiving, at a secondary verifier operating in a verifiable system, a request from a relying party to perform a verification process with respect to attestation evidence of a device in communication with the relying party, communicating self-attestation evidence, by the secondary verifier, to a trusted verifier to generate an attestation report of the verifiable system, communicating the attestation report of the verifiable system or other indicator of trustworthiness to the relying party to indicate trustworthiness of the secondary verifier with respect to performing the verification process, and performing, by the secondary verifier, the verification process on the attestation evidence of the device in communication with the relying party. The verifiable system includes instructions of a secondary verifier stored and executed by the verifiable system to perform the method to distribute verification of attestation evidence.

18 Claims, 5 Drawing Sheets

DISTRIBUTED VERIFICATION OF ATTESTATION EVIDENCE

BACKGROUND

Attestation allows a device to prove properties about itself such as what software it is running, its identity, security capabilities, etc. Remote attestation is used as part of a process to establish trust between devices so that information passed between the two devices can be expected to be authentic, intact, and trustworthy. The accuracy of the attestation mechanism is itself subject to trust in the verifying entity (a "verifier").

In secure communication between parties, a relying party, such as a bank, relies on a verifier to establish the integrity of an individual or device in communication with the relying party. In order to provide a high level of security, the verifier software executes its code in a secure computing system so that third parties cannot interfere. A device in communication with the relying party presents its credentials in a message to the relying party. These credentials are termed attestation evidence. For example, the attester, e.g., the device in this example, presents a set of data including endorsements and measurements. One measurement that can be included is the device's public key. Another common measurement is the digest of the software that will be executed in the secure computing system environment.

A verification of the device is done, and the verifier produces an attestation report for the relying party. The attestation report contains trust metrics of the device. The verification is useful in improving the level of trust and security in communication partners. To provide trustworthy verification capabilities for the attestation mechanism on behalf of a relying party, the verifier needs to be operated at the highest level of security and availability.

BRIEF SUMMARY

Distributed verification of attestation evidence is presented. Through the processes described herein, it is possible to run a verifier of attestation evidence in a less stringent environment.

A method includes receiving, at a secondary verifier operating in a verifiable system, a request from a relying party to perform a verification process with respect to attestation evidence of a device in communication with the relying party, communicating self-attestation evidence, by the secondary verifier, to a trusted verifier to generate an attestation report of the verifiable system, communicating an indicator of trustworthiness to the relying party of the secondary verifier to indicate trustworthiness of the secondary verifier with respect to performing the verification process, performing, by the secondary verifier, the verification process on the attestation evidence of the device in communication with the relying party, and communicating, by the secondary verifier, an attestation report of the device to the relying party.

A verifiable system includes instructions of a secondary verifier stored and executed by the verifiable system, the secondary verifier, when executed by the verifiable system, receives a request from a relying party to perform a verification process with respect to attestation evidence of a device in communication with the relying party, communicates self-attestation evidence to a trusted verifier operating in a secure computing system environment to generate an attestation report of the verifiable system, communicates the attestation report of the verifiable system to the relying party to indicate trustworthiness of the secondary verifier with respect to performing the verification process, and performs the verification process on the attestation evidence of the device in communication with the relying party.

A method includes forming a trusted network comprising multiple secondary verifiers by the multiple secondary verifiers performing a mutual attestation with one another protocol, receiving, at one secondary verifier of the multiple secondary verifiers, the one secondary verifier operating in a verifiable system, a request from a relying party to perform a verification process with respect to attestation evidence of a device in communication with the relying party, communicating self-attestation evidence, by the one secondary verifier of the multiple secondary verifiers, to a trusted verifier to generate an attestation report of the verifiable system, communicating the attestation report of the verifiable system to the relying party to indicate trustworthiness of the secondary verifier with respect to performing the verification process, and performing, by a further secondary verifier of the multiple secondary verifiers, the verification process on the attestation evidence of the device in communication with the relying party.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Distributed verification of attestation evidence is presented. Through the processes described herein, it is possible to run a verifier of attestation evidence in a less stringent environment.

Because a verifier needs to be operated at the highest level of security and availability to provide trustworthy verification capabilities for the attestation mechanism on behalf of a relying party, it can be challenging to implement a verifier. Verifiers tend to be hosted in data centers and require specialized hardware and software that is subject to strict verification and security analysis for maintaining security against malicious activities. Loss of the verification service causes the attestation mechanism to break down. This is a high level of responsibility for the verifier and thus there is a need to distribute this responsibility between multiple verifiers to reduce the burden of security and availability on a single verifier.

In order to reduce the load and responsibility of a single verifier, a trusted verifier can be used to assist in creating another or other verifier(s) in a potentially untrusted environment. A two-step verification process is thus presented in which a less secure device can run verification software to verify devices by first being verified by the trusted verifier.

Figure 1:
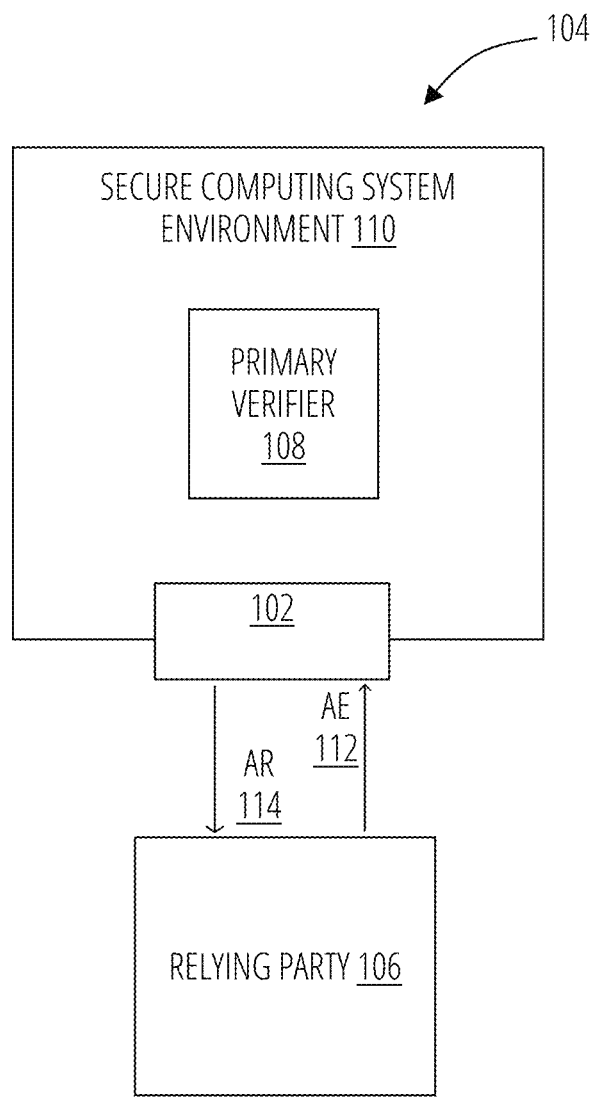
FIG. 1 illustrates a schematic diagram of a trusted verifier in communication with a relying party.

FIG. 1 illustrates a schematic diagram of a trusted verifier 104 in communication with a relying party 106. The trusted verifier 104 includes primary verifier 108 hosted within a secure computing system environment 110. The secure computing system environment 110 may be a data center such as a cloud data center and may include specialized hardware such as a hardware security module (HSM). In an embodiment, a trusted execution environment (TEE) can be executed by the secure computing system environment 110. The trusted execution environment may include physical circuitry elements, hardware, comprising logical elements controlled by a central processing unit. As an example, a CCA Realm, a hardware-based trusted execution environment, can be utilized as the secure computing system environment 110.

The primary verifier 108 executes its code within the secure computing system environment 110 and can verify attestation evidence in a message presented to the primary verifier 108 for correctness. The secure computing system environment 110 includes a first interface 102 to communicate with other entities. The first interface 102 includes interface circuitry to provide communication between the secure computing system environment circuitry and circuitry of an entity that is communicatively coupled to the secure computing system environment 110.

A relying party 106 may be the entity that is communicatively coupled to the trusted verifier 104. The relying party 106 sends attestation evidence, AE 112, to the trusted verifier 104 to be verified. The primary verifier 108 verifies the attestation evidence for correctness and sends an attestation report, AR 114, back to the relying party 106 with the results.

Figure 2:
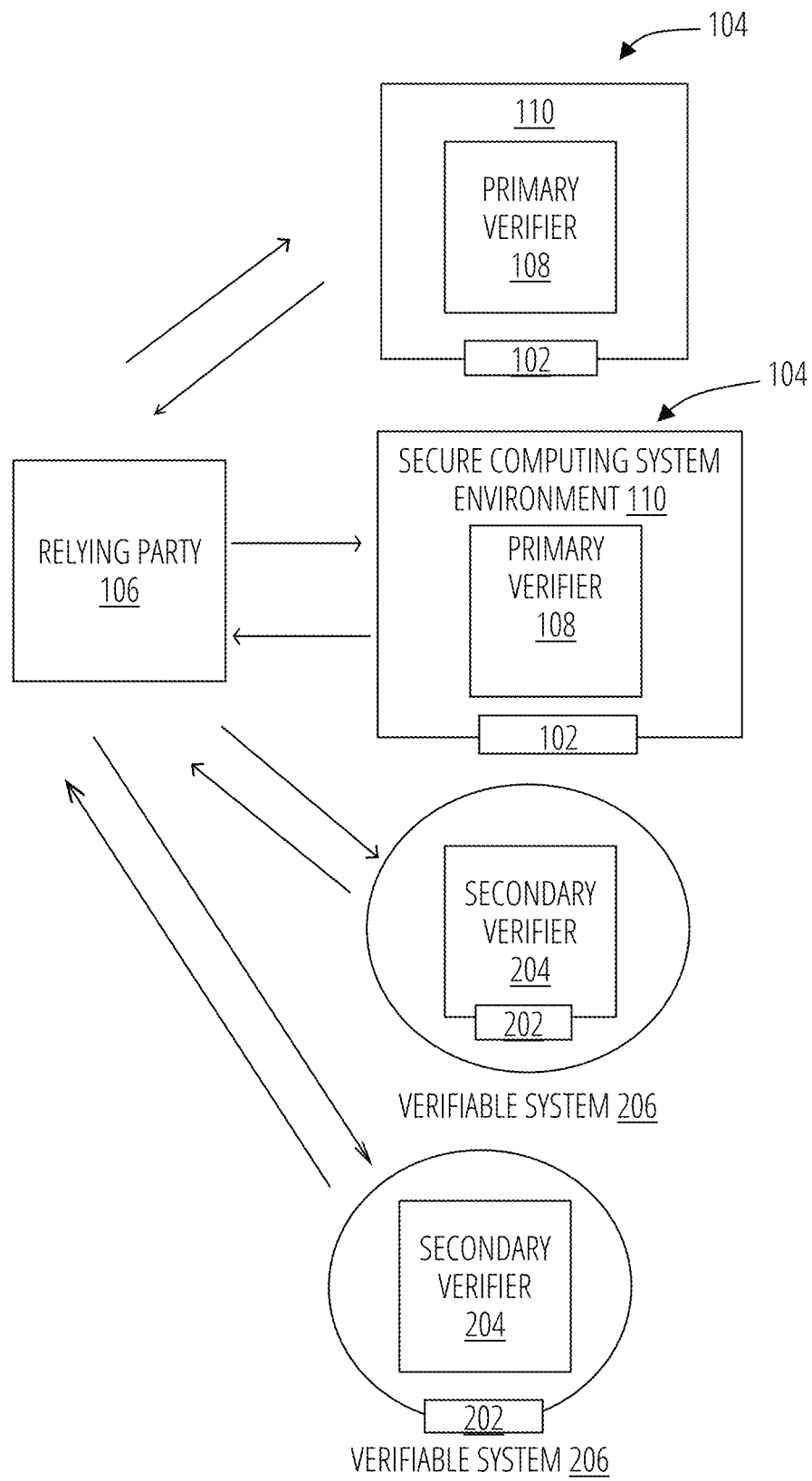
FIG. 2 illustrates a schematic diagram of a relying party in communication with a plurality of verifiers in accordance with one embodiment.

FIG. 2 illustrates a schematic diagram of a relying party 106 in communication with a plurality of verifiers in accordance with an embodiment. Instead of a single verifier, an operating environment for a relying party 106 can include multiple verifiers. The relying party 106 can communicate with different types of verifiers depending on access (to a particular verifier) and type of device being verified. For example, the relying party 106 can communicate with trusted verifiers 104, e.g., a verifier operating in a secure computing system environment 110, such as described with reference to FIG. 1.

Alternately, the relying party 106 can communicate with secondary verifiers 204. A secondary verifier 204 is a verifier that is itself verifiable. The secondary verifier 204 may be operating in a secure data center or on-premise server and has the capability to evaluate policies and store private keys without compromising the private keys (with at least some level of security). The secondary verifier 204 includes a second interface 202 comprising interface circuitry to communicate with other entities. However, in contrast to a trusted verifier 104, the secondary verifier 204 does not operate in a secure computing system environment 110. That is, the security measures applied to the secondary verifier 204 may be less stringent than a fully trusted verifier (e.g., the trusted verifier 104) or even if as stringent as the fully trusted verifier, responsibilities with respect to warranties on the security can be shifted (or confirmed). In particular, the secondary verifier 204 operates in a verifiable system 206 so that the secondary verifier 204 can be verified by a trusted verifier 104 to be considered another trusted verifier to the relying party 106. For example, the secondary verifier 204 may be a system under control of or operating on behalf of a silicon vendor (i.e., the vendor that produces the chip that is found in the device being verified by the relying party 106).

Figure 3:
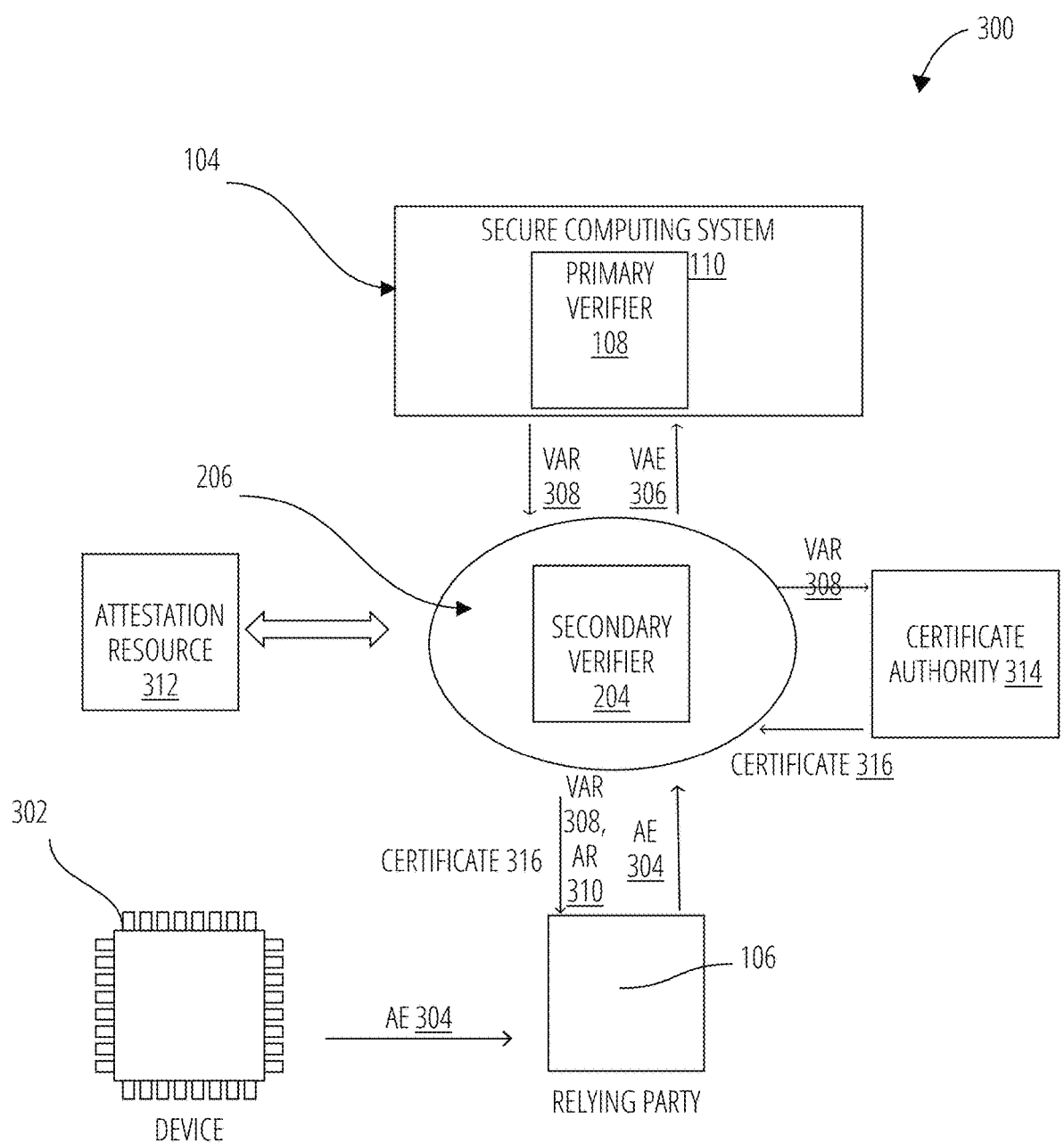
FIG. 3 illustrates a schematic diagram of an operating environment in a distributed verification system in accordance with one embodiment.

FIG. 3 illustrates a schematic diagram of an operating environment 300 for a distributed attestation system in accordance with one embodiment. Referring to FIG. 3, during certain communications between a device 302 and a relying party 106, the relying party 106 relies on a verifier to establish the integrity of the device 302 so that those certain communications and associate operations can be considered secure. For example, use of a banking application executed on a device can be verified by a relying party through the described systems.

In the illustrated scenario, the relying party 106 provides the AE 304 to a third party, a secondary verifier for verification. As explained with respect to FIG. 2, a secondary verifier 204 is a verifier that itself can be verified (operating on a verifiable system). The secondary verifier 204 can be any system performing verification processes for attestation evidence and may be specific to a particular device or be any appropriate system that is in communication with a relying party 106.

Figure 5:
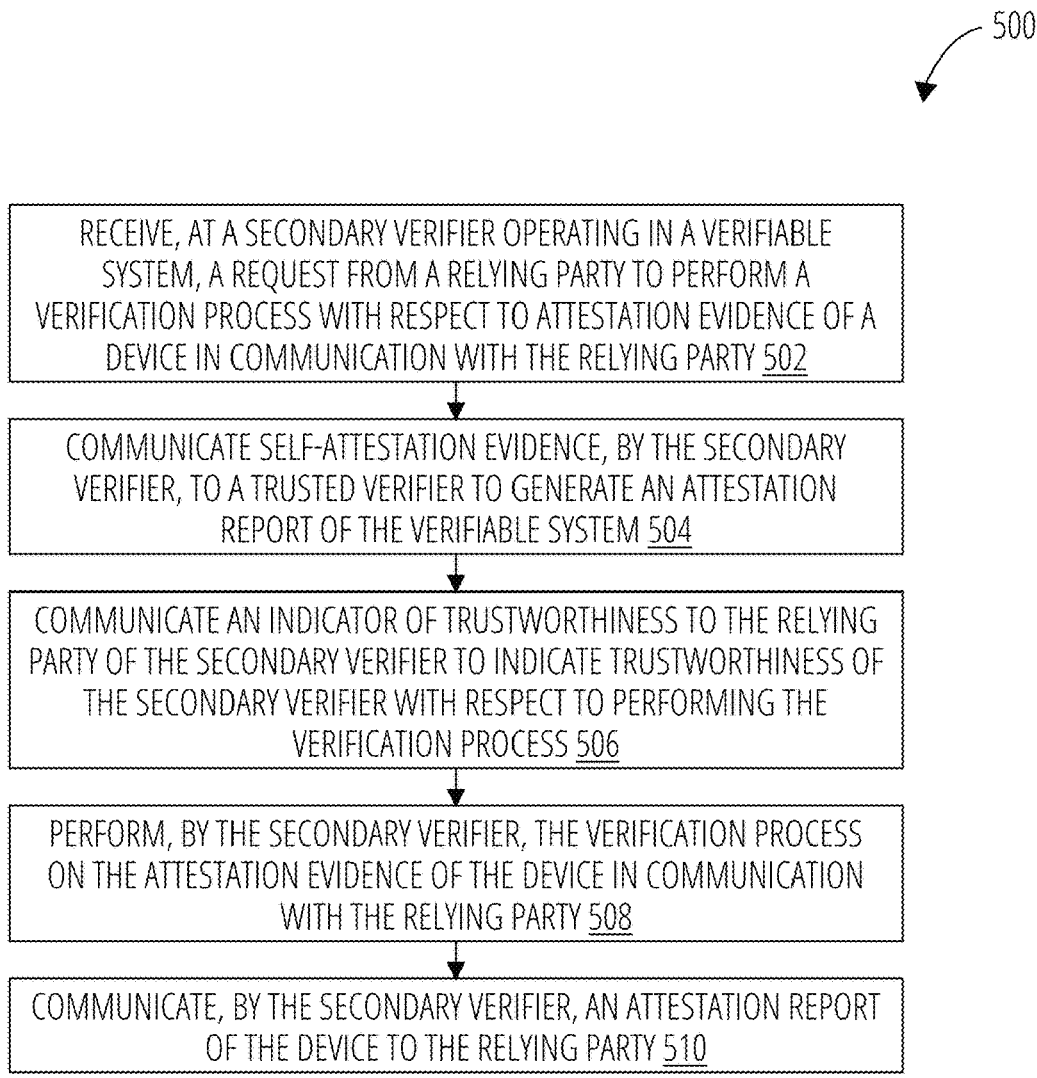
FIG. 5 illustrates a method in accordance with one embodiment.

The secondary verifier 204 performs method 500 as described with respect to FIG. 5. In particular, secondary verifier 204 can receive requests from the relying party 106 to perform a verification process with respect to attestation evidence (AE 304) of a device 302 in communication with the relying party 106 and can perform the verification process on the attestation evidence (AE 304) of the device 302. The secondary verifier 204 also can communicate self-attestation evidence (verifier attestation evidence VAE 306) to a primary verifier 108 (which is a trusted verifier) to generate an attestation report (verifier attestation report VAR 308) of the verifiable system on which the secondary verifier is executing and can communicate the attestation report (VAR 308) of the verifiable system to the relying party 106 to indicate trustworthiness of the secondary verifier 204 with respect to performing the verification process.

In some cases, before the relying party 106 sends the request to perform the verification process, the relying party 106 requests that the secondary verifier 204 provide a self-attestation report. In some cases, the request to perform the verification process of the device 302 inherently or explicitly includes the request to provide a self-attestation report.

In some cases, the secondary verifier 204 ensures that it has a valid attestation report (VAR 308) (e.g., by storing the report and checking that the report has not expired before requesting a new attestation report from the primary verifier 108) so that the secondary verifier 204 can send the valid attestation report (VAR 308) for itself before, with (in a joint attestation report, for example), or after sending the attestation report (AR 310) for the device without having to request a valid attestation report (VAR 308) from the primary verifier 108 for each request from a relying party 106. This is also useful for scenarios where the secondary verifier 204 goes offline and cannot reach a primary verifier 108 for a period of time.

In some cases, the secondary verifier 204 sends the valid attestation report VAR 308 along with a certificate signing request (CSR) to a certificate authority 314. The certificate authority 314 audits the attestation report VAR 308 and issues a certificate 316 for the secondary verifier 204 entitling the secondary verifier 204 to perform verifications for a period of time. In this way, the burden of auditing the secondary verifier is offloaded to a certificate authority 314 and the relying party 106 is unaware that the verifier is a secondary verifier. The certificate 316 issued by the certificate authority 314 is another indicator of trustworthiness to prove trustworthiness of the secondary verifier 204.

An example implementation of the process is as follows. In response to receiving a request from the relying party 106 to perform a verification process with respect to attestation evidence (AE 304) of device 302 (and if the secondary verifier 204 does not have a stored valid attestation report (VAR 308), the secondary verifier 204 presents self-attestation evidence (VAE 306) to the trusted verifier 104 (for verification by the primary verifier 108). The trusted verifier 104 (through the primary verifier 108) generates an attestation report (VAR 308) of the verifiable system 206 and sends the attestation report (VAR 308) back to the secondary verifier 204. The attestation report (VAR 308) of the secondary verifier 204 is sent to the relying party 106 to prove its trustworthiness.

As mentioned above, the attestation of the secondary verifier 204 may be done at the time the secondary verifier 204 has a verification to perform on the attestation evidence (AE 304) of the device 302, but just prior to performing the verification of the attestation evidence (AE 304) of the device 302. Alternately, the attestation of the secondary verifier 204 may be done in advance. For example, the secondary verifier 204 can proactively have a verification of itself performed by the trusted verifier 104 well before it needs to perform a verification of attestation evidence (AE 304) of the device 302. The secondary verifier 204 can store the attestation report (VAR 308) from the verification of itself by the trusted verifier 104 in the verifiable system, such as in a cache or other memory location, until the report expires. For example, the attestation report (VAR 308) may have an expiration period set to one day so that the stored report is valid for a day, which can simplify/speed up the verification process. Of course, less or more time may be assigned to the validity of the attestation report (VAR 308).

Once attested, the secondary verifier 204 is prepared to verify the attestation evidence (AE 304) of the device 302. In order to perform the verification of the device 302, the secondary verifier 204 will need to be able to access device-specific data. The secondary verifier 204, however, may not have adequate memory to store device-specific data, referred to as verification data, for the many devices it may be called upon to verify and/or may not have information of all the different devices it may be called upon to verify. In such cases, the secondary verifier 204 will can obtain the verification data from an external source. The external source may be another secondary verifier (e.g., shown in FIG. 2 or described with respect to FIG. 4) or an external storage device (which may be accessible by a plurality of systems providing verification processes). In an embodiment, the secondary verifier 204 receives the device-specific verification data from a secure attestation resource 312. The verification data can only be accessed in the attestation resource 312, however, from a verified instance. For example, the attestation resource 312 may require the attestation report (VAR 308) of the secondary verifier 204. Alternately, as described in more detail with respect to FIG. 4, the secondary verifier 204 can receive the device-specific data from a file sharing network. For example, the secondary verifier 204 may be one of multiple secondary verifiers, each secondary verifier having a portion of the verification data (device-specific data). These multiple secondary verifiers 204 make up a peer-to-peer file sharing network. The secondary verifier 204 reaches out within the file sharing network to find the verification data it needs to verify the device 302.

Once the secondary verifier 204 has the verification data for the device 302, the secondary verifier 204 verifies the attestation evidence (AE 304) of the device 302 by checking the verification data. If the attestation evidence (AE 304) satisfies conditions with respect to the verification data, the secondary verifier 204 verifies the attestation evidence (AE 304) and sends an attestation report (AR 308) of the device to the relying party 106.

Figure 4:
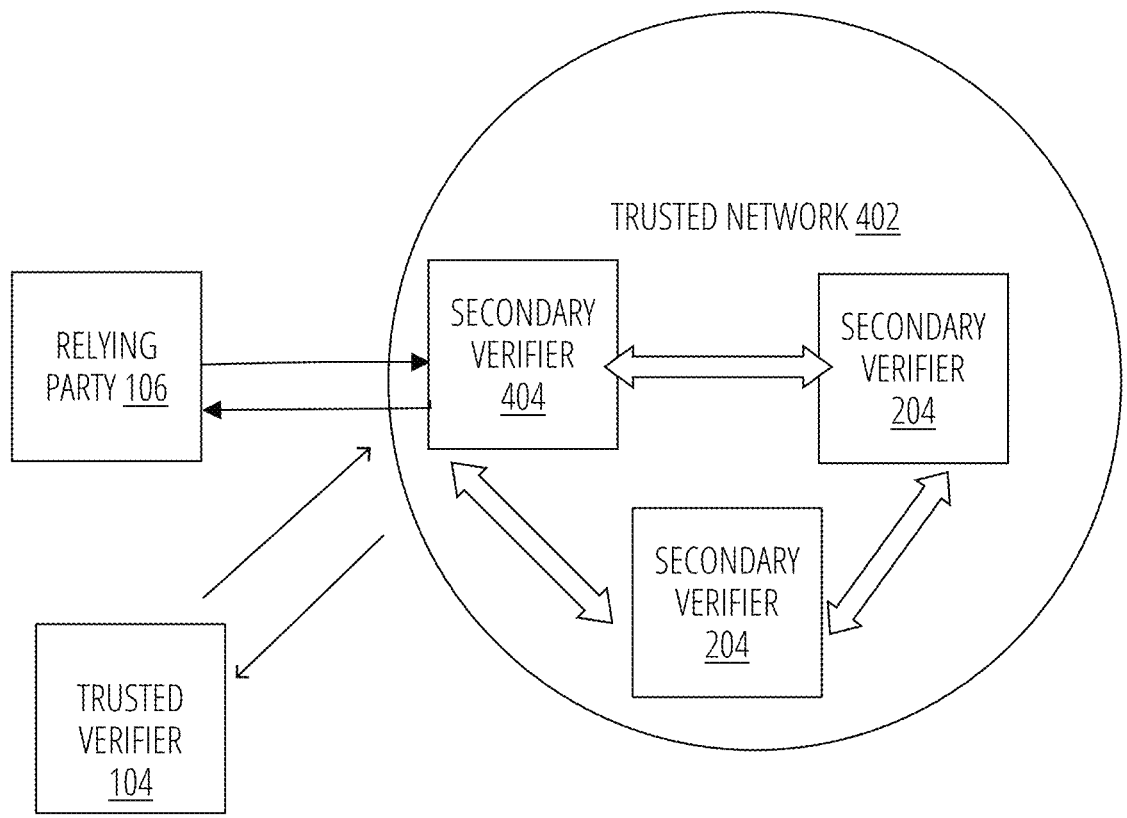
FIG. 4 illustrates a schematic diagram of a trusted network of secondary verifiers in communication with a relying party in accordance with one embodiment.

FIG. 4 illustrates a schematic diagram of a trusted network of secondary verifiers in communication with a relying party in accordance with one embodiment. As shown in FIG. 4, a relying party 106 is in communication with a secondary verifier 204 that is one of a trusted network 402 of secondary verifiers 204. In order to form the trusted network 402, the secondary verifiers 204 form trust relationships, such as by performing a mutual attestation with each other. The mutual attestation may be done by direct attestation with one another or by using a trusted gossip protocol. Direct attestation is performed when each pair of secondary verifiers performs an attestation of each other.

A gossip protocol is a process of peer-to-peer communication that relies on each peer in the network to spread data to its neighbor. When there is a large number of secondary verifiers 204, direct attestation of pairs of secondary verifiers 204 can be computationally challenging equating to numerous operations. Thus, by utilizing a trusted gossip protocol, a large peer-to-peer trusted network 402 can be formed. In this case, a trusted verifier 104 can be used as a back-up node in the trusted network 402.

In an embodiment of a trusted gossip protocol, a list of trusted secondary verifiers 204 is maintained, reducing the number of operations needed to be performed. The gossip protocol works by adding the trusted verifiers of each secondary verifier 204 in the trusted network 402 to the list of trusted secondary verifiers 204. While this one example of a trusted gossip protocol, other peer to peer network protocols can also work for the proposed method.

Once the secondary verifiers 204, 404 are mutually attested and a trusted network 402 is formed, an attestation of a device (e.g., device 302) can be performed by an already-verified secondary verifier 404 in the trusted network 402. The relying party 106 forms a relationship with this originating secondary verifier 404 of the multiple secondary verifiers 204, 404 in the trusted network 402. FIG. 4 illustrates the relying party 106 forming a relationship with the originating secondary verifier 404 in the trusted network 402. Attestation evidence is then sent to the originating secondary verifier 404 by the relying party 106 for verification.

The originating secondary verifier 404 performs verification of the attestation evidence in view of the device-specific data. In an embodiment, each secondary verifier 204, 404 in the trusted network 402 includes a portion of verification data. The portion of verification data refers to a subset of device-specific data of all possible device-specific data available for verification. Some verifiers may store a same subset of device-specific data with others storing different subsets of data. In some cases, a secure storage resource, such as attestation resource 312 described with respect to FIG. 3, can be used by the trusted network 402 to store the necessary device-specific data.

When the originating secondary verifier 404 has the appropriate verification data in its subset of device-specific data, the originating secondary verifier 404 verifies the attestation evidence and sends an attestation report to the relying party 106. However, if the originating secondary verifier 404 does not have the appropriate verification data to verify the attestation evidence of the device 302, the originating secondary verifier 404 can check with the other secondary verifiers 204 in the trusted network 402 (and/or the secure attestation resource 312) to find one that does have the appropriate verification data.

In an embodiment, the originating secondary verifier 404 sends a request to the other secondary verifiers 204 in the trusted network 402 for the appropriate verification data to verify the device 302. The request may be sent out over the trusted network 402 utilizing the trusted gossip protocol, for example. Each of the other secondary verifiers 204 checks their respective portion of verification data. When one of the secondary verifiers 204 has the appropriate verification data, the secondary verifier 204 sends the appropriate verification data to the originating secondary verifier 404. The originating secondary verifier 404 verifies the attestation evidence utilizing the appropriate verification data and sends the attestation report of the verification back to the relying party 106.

In another embodiment, the originating secondary verifier 404 sends the attestation evidence over the trusted network 402 to the other secondary verifiers 204. Each of the other secondary verifiers 204 checks their respective portion of verification data for the correct verification data. A further secondary verifier 204, having the correct verification data verifies the attestation evidence and sends the attestation report back via the trusted network 402 to the originating secondary verifier 404. The originating secondary verifier 404 then returns the result to the relying party 106 in the attestation report.

FIG. 5 illustrates a method 500 to verify attestation evidence, in accordance with one embodiment. Referring to FIG. 5, in block 502, a secondary verifier operating in a verifiable system receives, a request from a relying party to perform a verification process with respect to attestation evidence of a device in communication with the relying party. In block 504, the secondary verifier communicates self-attestation evidence to a trusted verifier to generate an attestation report of the verifiable system. In block 506, the secondary verifier communicates an indicator of trustworthiness to the relying party of the secondary verifier to indicate trustworthiness of the secondary verifier with respect to performing the verification process. In block 508, the secondary verifier performs the verification process on the attestation evidence of the device in communication with the relying party. In block 510, the secondary verifier communicates an attestation report of the device to the relying party.

In operation, the proposed method distributes the load/responsibility of an attestation evidence verifier, reducing maintenance overhead and improving security. The proposed method creates a verifier network of secondary verifiers that is robust to failure. For example, attestation of a device typically requires access to a trusted verifier. While this attestation process is secure, it is not robust to network failure. If internet access fails, then any operation that depends on an attestation will also fail. The proposed method allows a local infrastructure, e.g., using secondary verifiers, to securely operate a verifier for a local device. The attestation evidence for the attestation requests may then be locally stored. In addition, the created verifier network can withstand a temporary failure of the trusted verifier. The verifier network of secondary verifiers can be guarded against an attack from a malicious attacker as it only communicates with other verified devices, effectively operating within a trusted VPN (Virtual Private Network).

What is claimed is:

1. A method, comprising:
   receiving, at a secondary verifier operating in a verifiable system, a request from a relying party to perform a verification process with respect to attestation evidence of a device in communication with the relying party, wherein the secondary verifier is one of multiple secondary verifiers;
   communicating self-attestation evidence, by the secondary verifier, to a trusted verifier operating in a secure computing system environment to generate an attestation report of the verifiable system;
   communicating an indicator of trustworthiness to the relying party of the secondary verifier to indicate trustworthiness of the secondary verifier with respect to performing the verification process;
   performing, by the secondary verifier, the verification process on the attestation evidence of the device in communication with the relying party;
   performing, by the secondary verifier with a further secondary verifier of the multiple secondary verifiers, a mutual attestation to form a trusted network of secondary verifiers, wherein verification data used in the verification process is obtained from the further secondary verifier; and
   communicating, by the secondary verifier, an attestation report of the device to the relying party.

2. The method of claim 1, wherein the indicator of trustworthiness of the secondary verifier is the attestation report of the verifiable system.

3. The method of claim 1, further comprising:
   communicating, by the secondary verifier, the attestation report of the verifiable system and a certificate signing request to a certificate authority,
   receiving, by the certificate authority, the attestation report of the verifiable system and the certificate signing request,
   auditing, by the certificate authority, the attestation report of the verifiable system, issuing, by the certificate authority, a certificate as the indicator of trustworthiness of the secondary verifier, and
   communicating, by the certificate authority, the certificate to the secondary verifier.

4. The method of claim 2, wherein the communicating of the attestation report of the verifiable system to the relying party and the communicating of the attestation report of the device to the relying party are performed by sending the attestation report of the device and the attestation report of the verifiable system in a joint attestation report to the relying party.

5. The method of claim 1, further comprising storing, at the verifiable system of the secondary verifier, the attestation report of the verifiable system.

6. The method of claim 1, wherein the communicating of the self-attestation report by the secondary verifier is sent before receiving the request from the relying party to perform the verification process with respect to attestation evidence of the device.

7. The method of claim 1, wherein performing the verification process includes obtaining the verification data of the device from an external source.

8. The method of claim 7, wherein the verification data is obtained from a secure attestation resource.

9. The method of claim 1, wherein the mutual attestation is performed by direct attestation.

10. The method of claim 1, wherein the mutual attestation is performed using a trusted gossip protocol.

11. The method of claim 1, wherein the obtaining of the verification data from the further secondary verifier includes sending a request through the trusted network of secondary verifiers for correct verification data and receiving the correct verification data from the further secondary verifier.

12. A verifiable system, comprising:
instructions of a secondary verifier stored and executed by hardware including physical circuitry elements of the verifiable system, the secondary verifier, when executed by the hardware of the verifiable system:
receives a request from a relying party to perform a verification process with respect to attestation evidence of a device in communication with the relying party, wherein the secondary verifier is one of multiple secondary verifiers,
communicates self-attestation evidence to a trusted verifier operating in a secure computing system environment to generate an attestation report of the verifiable system,
communicates the attestation report of the verifiable system to the relying party to indicate trustworthiness of the secondary verifier with respect to performing the verification process, and
performs the verification process on the attestation evidence of the device in communication with the relying party,
performs, by the secondary verifier with a further secondary verifier of the multiple secondary verifiers, a mutual attestation to form a trusted network of secondary verifiers, wherein verification data used in the verification process is obtained from the further secondary verifier, and
communicates, by the secondary verifier, an attestation report of the device to the relying party.

13. The verifiable system of claim 12, wherein the verification process utilizes verification data stored in an attestation resource.

14. The verifiable system of claim 12, wherein the trusted verifier is a primary verifier hosted in a cloud data center.

15. The verifiable system of claim 12, wherein the secondary verifier operates as a silicon vendor.

16. A method to distribute verification of attestation evidence between multiple secondary verifiers, comprising:
forming a trusted network comprising multiple secondary verifiers by the multiple secondary verifiers performing a mutual attestation with one another;
receiving, at one secondary verifier of the multiple secondary verifiers, the one secondary verifier operating in a verifiable system, a request from a relying party to perform a verification process with respect to attestation evidence of a device in communication with the relying party;
communicating self-attestation evidence, by the one secondary verifier of the multiple secondary verifiers, to a trusted verifier to generate an attestation report of the verifiable system;
communicating the attestation report of the verifiable system to the relying party to indicate trustworthiness of the secondary verifier with respect to performing the verification process; and
performing, by a further secondary verifier of the multiple secondary verifiers, the verification process on the attestation evidence of the device in communication with the relying party.

17. The method of claim 16, wherein the mutual attestation is performed by direct attestation.

18. The method of claim 16, wherein the mutual attestation is performed using a trusted gossip protocol.

* * * * *